United States Patent
Jung et al.

(10) Patent No.: US 11,907,036 B2
(45) Date of Patent: Feb. 20, 2024

(54) INTEGRATED CIRCUIT PERFORMING DYNAMIC VOLTAGE AND FREQUENCY SCALING OPERATION AND OPERATING METHOD THEREOF

(71) Applicant: SAMSUNG ELECTRONICS CO., LTD., Suwon-si (KR)

(72) Inventors: Yousub Jung, Seongnam-si (KR); Seokju Yoon, Yongin-si (KR); Jihan Cha, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 203 days.

(21) Appl. No.: 17/489,299

(22) Filed: Sep. 29, 2021

(65) Prior Publication Data

US 2022/0179471 A1    Jun. 9, 2022

(30) Foreign Application Priority Data

Dec. 4, 2020    (KR) .................. 10-2020-0168724

(51) Int. Cl.
| | |
|---|---|
| *G06F 1/28* | (2006.01) |
| *G06F 1/24* | (2006.01) |
| *G06F 1/324* | (2019.01) |
| *G06F 1/3234* | (2019.01) |
| *G06F 1/3296* | (2019.01) |
| *G06F 9/50* | (2006.01) |
| *G06F 1/3237* | (2019.01) |
| *G06F 1/08* | (2006.01) |
| *G06F 1/14* | (2006.01) |

(52) U.S. Cl.
CPC . *G06F 1/28* (2013.01); *G06F 1/14* (2013.01)

(58) Field of Classification Search
CPC ............ G06F 1/28; G06F 1/14; G06F 1/3203
See application file for complete search history.

(56) References Cited

U.S. PATENT DOCUMENTS

| | | | |
|---|---|---|---|
| 9,568,941 B2 | 2/2017 | Jung | |
| 10,747,297 B2 | 8/2020 | Yoon et al. | |
| 2012/0054519 A1* | 3/2012 | Branover | G06F 1/3215 713/320 |
| 2012/0324248 A1* | 12/2012 | Schluessler | G06F 1/329 713/300 |
| 2014/0215241 A1* | 7/2014 | Yoon | G06F 1/3275 713/320 |
| 2015/0309560 A1* | 10/2015 | Liang | G06F 1/3296 713/320 |
| 2016/0349828 A1* | 12/2016 | Weissmann | G06F 1/3296 |

(Continued)

FOREIGN PATENT DOCUMENTS

| | | |
|---|---|---|
| KR | 102118799 | 6/2020 |
| WO | WO-2021184248 A1 * | 9/2021 |

*Primary Examiner* — Jaweed A Abbaszadeh
*Assistant Examiner* — Gayathri Sampath
(74) *Attorney, Agent, or Firm* — Fish & Richardson P.C.

(57) ABSTRACT

An integrated circuit includes a plurality of sub blocks configured to process an instruction according to an operating condition, a plurality of active counters configured to count an active time, which is a time for each of the plurality of sub blocks to process an instruction, and a Dynamic Voltage and Frequency Scaling (DVFS) controller configured to calculate power consumption of the plurality of sub blocks during a sample period based on the active time and adjust an operating condition of the plurality of sub blocks based on the power consumption.

18 Claims, 14 Drawing Sheets

(56) References Cited

U.S. PATENT DOCUMENTS

| | | |
|---|---|---|
| 2017/0192484 A1* | 7/2017 | Priyadarshi ............ G06F 1/3296 |
| 2020/0151005 A1 | 5/2020 | Park et al. |
| 2020/0264683 A1 | 8/2020 | Jung |
| 2020/0264691 A1 | 8/2020 | Kurian et al. |
| 2020/0272220 A1 | 8/2020 | Mosalikanti et al. |
| 2021/0208663 A1* | 7/2021 | Cooper ..................... G06F 1/30 |

* cited by examiner

FIG. 5

POWER COEFFICIENT TABLE

| SB ID | Pcoef |
|-------|-------|
| SB1 | C1 |
| SB2 | C2 |
| SB3 | C3 |
| SB4 | C4 |
| ⋮ | ⋮ |

— # INTEGRATED CIRCUIT PERFORMING DYNAMIC VOLTAGE AND FREQUENCY SCALING OPERATION AND OPERATING METHOD THEREOF

CROSS-REFERENCE TO RELATED APPLICATION

This application is based on and claims priority under 35 U.S.C. § 119 to Korean Patent Application No. 10-2020-0168724, filed on Dec. 4, 2020, in the Korean Intellectual Property Office, the disclosure of which is incorporated by reference herein in its entirety.

BACKGROUND

The disclosure relates to an integrated circuit and more particularly to an integrated circuit that performs a Dynamic Voltage and Frequency Scaling (DVFS) operation considering power consumption and a method of operating the same.

As technology advances, power management and user experience of computing systems, such as mobile devices, are important. In order to increase multi-thread performance in a mobile environment, as the number of cores increases and patented master intellectual properties (IPs) are continuously added to various multimedia scenarios in an application processor, the number of competing entities that use memory is diversified. Accordingly, the application processor performs a dynamic voltage and frequency scaling (DVFS) operation to adjust the frequency and voltage in the application processor, thereby controlling performance and power consumption.

SUMMARY

The present disclosure relates to a computing system, a computing system including the integrated circuit, and a method of operating the integrated circuit. The integrated circuit reflects a power margin within performance improvement by performing a dynamic voltage and frequency scaling (DVFS) operation considering power consumption of a sub block.

According to an aspect of the present disclosure, an integrated circuit includes: a plurality of sub blocks configured to process an instruction according to an operating condition; a plurality of active counters configured to count an active time, which is a time for each of the plurality of sub blocks to process an instruction; and a Dynamic Voltage and Frequency Scaling (DVFS) controller configured to calculate power consumption of the plurality of sub blocks during a sample period based on the active time and adjust an operating condition of the plurality of sub blocks based on the power consumption.

According to another aspect of the present disclosure, a method of operating an integrated circuit, including a plurality of sub blocks that process an instruction according to an operating condition, includes: obtaining a workload based on a ratio of a sample period and a total active time in which at least one of the plurality of sub blocks is active; obtaining a power usage rate based on power consumption of the plurality of sub blocks during the sample period; and adjusting an operating condition according to a ratio between the workload and the power usage rate.

According to another aspect of the present disclosure, a computing system includes: a plurality of sub blocks each configured to process an instruction; active counters respectively corresponding to the plurality of sub blocks and configured to count a sub active time, which is an active time of each corresponding sub block; a total counter configured to count a total active time in which at least one of the plurality of sub blocks is active; a clock management unit configured to generate a clock signal applied to the plurality of sub blocks; a power management unit configured to generate a power voltage applied to the plurality of sub blocks; and a Dynamic Voltage and Frequency Scaling (DVFS) controller configured to calculate power consumption consumed by the plurality of sub blocks during a sample period based on the sub active time and the total active time and control the clock management unit or the power management unit so that a frequency of the clock signal or a magnitude of the power voltage is adjusted based on the power consumption.

BRIEF DESCRIPTION OF THE DRAWINGS

Embodiments of the disclosure will be more clearly understood from the following detailed description taken in conjunction with the accompanying drawings in which:

FIG. 5 is a diagram illustrating a power coefficient table according to an exemplary embodiment of the present disclosure;

DETAILED DESCRIPTION OF THE EMBODIMENTS

Hereinafter, various embodiments of the disclosure will be described with reference to the accompanying drawings.

Figure 1:
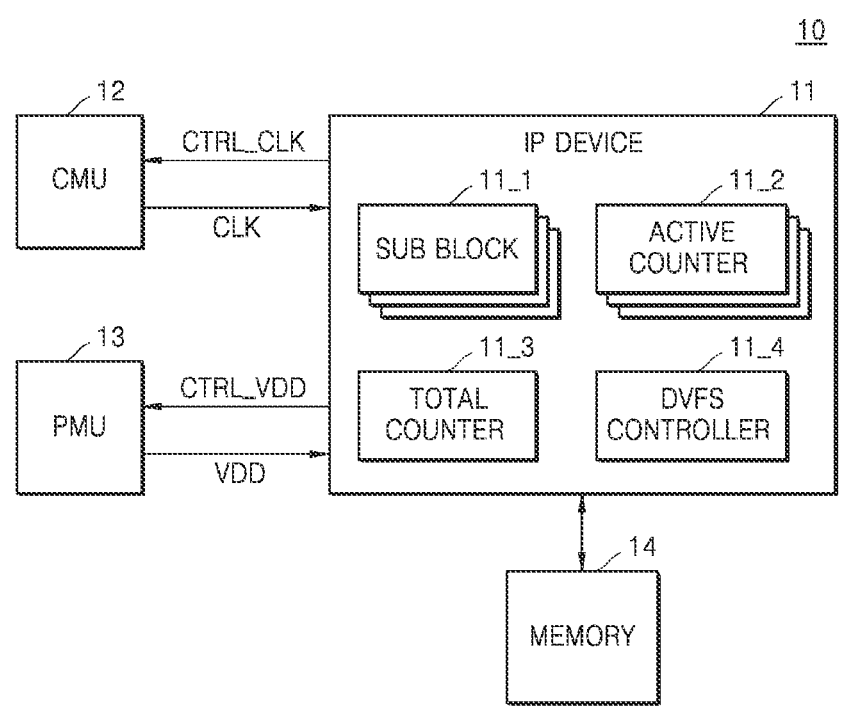
FIG. 1 is a block diagram illustrating a system according to an exemplary embodiment of the present disclosure.

FIG. 1 is a block diagram illustrating a system according to an exemplary embodiment of the present disclosure.

Referring to FIG. 1, a system 10 may include an intellectual property (IP) device 11, a clock management unit (CMU) 12, a power management unit (PMU) 13, and a memory 14.

The system 10 may correspond to various types of data processing devices and, as an example, may correspond to a mobile device. In addition, the system 10 may correspond to a laptop computer, a mobile phone, a smartphone, a tablet PC, a personal digital assistant PDA, an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of all things or everything (IoE) device, or an e-book.

The system 10 may include various types of memory devices. For example, the memory 14 may correspond to various types of semiconductor memory devices and may be Dynamic Random Access Memory (DRAM), such as Double Data Rate Synchronous Dynamic Random Access Memory (DDR SDRAM), Low Power Double Data Rate (LPDDR) SDRAM, Graphics Double Data Rate (GDDR) SDRAM, and Rambus Dynamic Random Access Memory (RDRAM). Further, the memory 14 may further be any one of flash memory, Phase-change RAM (PRAM), Magnetic RAM (MRAM), Resistive RAM (ReRAM), and Ferroelectric RAM (FeRAM).

In some embodiments, the system 10 may be implemented as a System on Chip (SoC). The SoC may include a system bus to which a protocol having a predetermined standard bus standard is applied, and components included in the system 10 may be connected to the system bus. For example, as a standard for a system bus, an Advanced Microcontroller Bus Architecture (AMBA) protocol of Advanced RISC Machine (ARM) may be applied. The bus type of the AMBA protocol may include Advanced High-Performance Bus (AHB), Advanced Peripheral Bus (APB), Advanced eXtensible Interface (AXI), AXI4, AXI Coherency Extensions (ACE), and the like. In addition, other types of protocols such as Sonics uNetwork, IBM CoreConnect, and Open Core Protocol of OCP-IP may be applied.

The IP device 11 may include a plurality of sub blocks 11_1, a plurality of active counters 11_2, a total counter 11_3, and a DVFS controller 11_4. The IP device 11 may be designed as an integrated circuit implemented with a plurality of transistors. The IP device 11 may be, for example, a central processing unit (CPU), a graphics processing unit (GPU), a neural processing unit (NPU), or an image signal processor (ISP). FIG. 1 illustrates one IP device 11, but the type and number of IP devices included in the system 10 may not be limited thereto. In some embodiments, at least some of the plurality of active counters 11_2, the total counter 11_3, and the DVFS controller 11_4 may be located outside the IP device 11.

Each of the plurality of sub blocks 11_1 may independently process a command. The sub block 11_1 may be a CPU core, a GPU core, an NPU core, or an ISP core. Because the IP device 11 includes a plurality of cores, the system 10 may also be referred to as a multi-core processor. The sub block 11_1 may also be referred to as a sub function block. A state in which a sub block 11_1 processes an instruction may be referred to as an active state, and a state in which a sub block 11_1 does not process an instruction may be referred to as an idle state. The time when the sub block 11_1 is active may be referred to as the sub active time, and the time when the sub block 11_1 is idle may be referred to as the idle time.

Each of the plurality of sub blocks 11_1 may process an instruction according to the clock signal CLK and the power voltage VDD. The performance of the sub block 11_1 may depend on the clock signal CLK and the power voltage VDD. As the magnitude of the power voltage VDD increases and the frequency of the clock signal CLK increases, the performance of the IP device 11 may be improved and power consumption of the IP device 11 may increase. In this specification, the frequency of the clock signal CLK and the magnitude of the power voltage VDD may be defined as an operating condition of the IP device 11. Also, the frequency of the clock signal CLK may be referred to as an operating frequency. In the following, for convenience of description, exemplary embodiments of the present disclosure will be mainly described with reference to operating conditions corresponding to the frequency of the clock signal CLK.

Each of the plurality of active counters 11_2 may count a sub active time corresponding to a sub block 11_1. For example, the first active counter may count the sub active time of the first sub block and the second active counter may count the sub active time of the second sub block. In this specification, the active time for one sub block may be referred to as a sub active time. The plurality of active counters 11_2 may correspond to the plurality of sub blocks 111, respectively. In one example, as described below with reference to FIG. 7, the active counter 11_2 may count the sub-active time based on a clock signal CLK applied to the sub block or a gating signal that controls supply of the power voltage VDD. In another example, the active counter 11_2 may acquire the sub active time by counting the number of cycles of the clock signal CLK applied to the sub block when the sub block is active. The sub-active time may be described later with reference to FIG. 3.

The total counter 11_3 may count the total active time. In this specification, the total active time may mean a time during which the IP device 110 is in an active state. Specifically, the total active time may be a time when at least one of the plurality of sub blocks 11_1 is active. The total active time may be described later with reference to FIG. 3.

The DVFS controller 11_4 may output control signals CTRL_CLK and CTRL_VDD for controlling an operating condition of the IP device 11 every sample period SP. Specifically, the DVFS controller 11_4 may output a clock control signal CTRL_CLK that controls the frequency of the clock signal CLK and output a voltage control signal CTRL_VDD that controls the level of the power voltage VDD.

The DVFS controller 11_4 may calculate the power consumed by the plurality of sub blocks 11_1 during the sample period SP based on the sub active times of the plurality of sub blocks 11_1 and the total active time of the IP device 11. Specifically, as described later with reference to FIG. 4, the DVFS controller 11_4 may calculate power consumed by the plurality of sub blocks 11_1 by referring to the power coefficient table stored in the internal memory 14.

The DVFS controller 11_4 may control an operating condition based on power consumed by the plurality of sub blocks 11_1. For example, when the power consumed by the plurality of sub blocks 11_1 is relatively low, the DVFS controller 11_4 controls the clock management unit 12 to generate a clock signal CLK having a higher frequency, so that the performance of the IP device 11 may be improved.

The DVFS controller 11_4 may refer to hardware capable of performing DVFS functions and operations or may refer to computer program code capable of performing DVFS functions and operations. However, the disclosure is not limited thereto and may refer to an electronic recording medium, such as a processor, on which computer program code capable of performing DVFS functions and operations is installed. That is, the DVFS controller 11_4 may mean a functional and/or structural combination of hardware for performing the technical idea of the disclosure and/or software for driving the hardware.

The clock management unit 12 may generate the clock signal CLK and may adjust the frequency of the clock signal CLK based on the clock control signal CTRL_CLK. For example, the clock manager 120 may include an oscillator that generates a clock signal CLK based on the clock control signal CTRL_CLK. The clock management unit 120 may also be referred to as a clock generator and a clock generation circuit.

The power management unit 13 may generate the power voltage VDD and may adjust the level of the power voltage VDD based on the voltage control signal CTRL_VDD. For example, the power management unit 13 may include a switching regulator that generates the power voltage VDD based on the control signal CTRL_VDD. The power management unit 13 may also be referred to as a power management integrated circuit (PMIC).

The memory 14 may be accessed by the IP device 11, and the IP device 11 may store data in the memory 14 or read data stored in the memory 140. The memory 14 may include a volatile memory device such as static random access memory (SRAM) and dynamic random access memory (DRAM) and may include a non-volatile memory device such as flash memory or resistive random access memory (RRAM). In some embodiments, as described below with reference to FIG. 4, the memory 14 may store a power coefficient table. In some embodiments, different from that shown in FIG. 1, the memory 14 may be included in the IP device 11.

Although not shown in the drawing, the system 10 may include various types of functional blocks, such as an input/output (I/O) interface block that communicates with the IP device 11, a universal serial bus (USB) host block, a USB slave block, and the like.

As described later with reference to the drawings, the DVFS controller 11_4 may calculate the power consumed by the IP device 11 during the sample period based on the total active time and the sub-active time and generate control signals CTRL_CLK and CTRL_VDD based on power consumption and provide the generated control signals CTRL_CLK and CTRL_VDD to the clock management unit 12 and the power management unit 13. Accordingly, when the power consumption is relatively low, the IP device 11 may reflect the remaining power margin in performance improvement.

Figure 2:
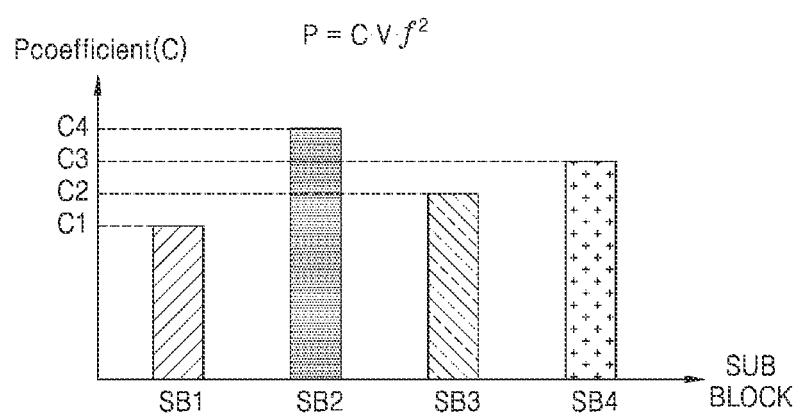
FIG. 2 is a diagram illustrating power consumption of a sub block according to an exemplary embodiment of the present disclosure.

FIG. 2 is a diagram illustrating power consumption of a sub block according to an exemplary embodiment of the present disclosure. Referring to FIG. 2, the power consumption P of the sub block may be expressed as [Equation 1].

$$P = C \cdot V \cdot f^2 \propto C \cdot f^3 \qquad \text{[Equation 1]}$$

Here, C is the capacitance of the sub block, V is the magnitude of the power voltage applied to the sub block, and f is the frequency of the clock signal applied to the sub block. Because the capacitor included in the sub block may be charged faster as the power voltage increases, the magnitude of the power voltage and the frequency of the clock signal may be proportional. Accordingly, the power consumption may be proportional to the cube of the frequency of the clock signal.

In the present specification, among the parameters related to power, parameters other than the frequency f of the clock signal and the magnitude V of the power voltage may be collectively referred to as a power coefficient. For example, in [Equation 1], the capacitance of the sub block may be referred to as a power coefficient.

The plurality of sub blocks 11_1 may have different circuit structures and thus may have different performances. That is, the number of instructions that the plurality of sub blocks 11_1 may process per unit time may be different. In addition, due to a different circuit structure, even if the magnitude of the power voltage is the same as the frequency of the clock signal, the power consumed by the plurality of sub blocks 11_1 may be different. That is, power coefficients of a plurality of sub blocks may be different.

Referring to FIG. 2, the power coefficient of the first sub block SB1 may be C1, the power coefficient of the second sub block SB2 may be C4, the power coefficient of the third sub block SB3 may be C2, and the power coefficient of the fourth sub block SB4 may be C3. Moreover, in some embodiments, different from FIG. 2, power coefficients of some of the plurality of sub blocks SB1, SB2, SB3, and SB4 may be the same. For example, as described later with reference to FIG. 12, a plurality of sub blocks may be divided into clusters, which are a set of sub blocks having the same performance. Specifically, the plurality of sub blocks may be divided into sub blocks included in the first cluster and sub blocks included in the second cluster. The sub block included in the first cluster consumes less power than the sub block included in the second cluster, but may provide relatively low performance.

Figure 3:
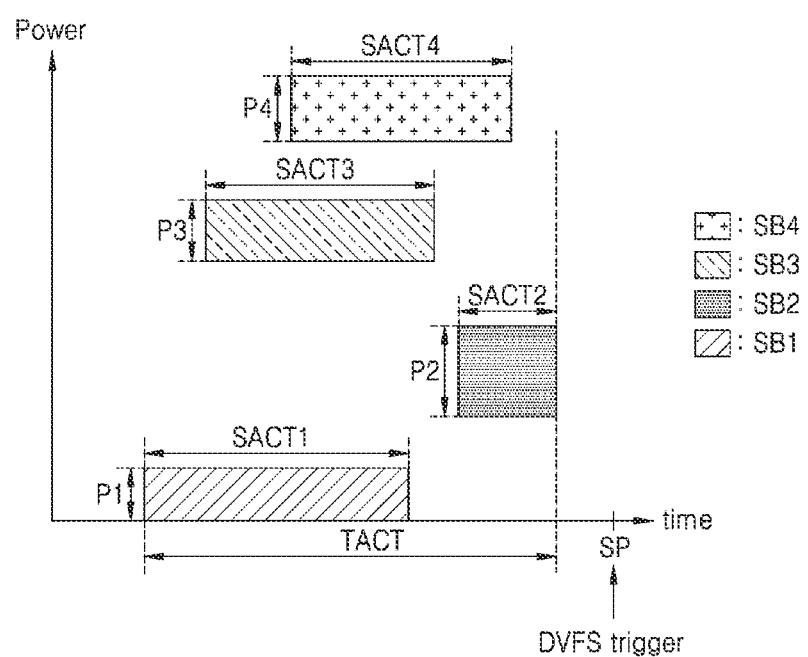
FIG. 3 is a diagram illustrating power consumption of a sub block according to an exemplary embodiment of the present disclosure.

FIG. 3 is a diagram illustrating power consumption of a sub block according to an exemplary embodiment of the present disclosure. The descriptions of FIG. 3 may be given later with reference to FIG. 1. Referring to FIG. 3, when the sample period SP arrives, the DVFS controller 11_4 may start the DVFS operation based on the power consumed by the IP device 11 during the sample period SP. The DVFS operation may be an operation of adjusting the operating condition of the IP device 11, that is, the frequency of the clock signal CLK or the magnitude of the power voltage VDD.

A plurality of sub blocks SB1 to SB4 included in the IP device 11 may be activated at different times. The first sub block SB1 may be activated during the first sub active time SACT1, the second sub block SB2 may be activated during the second sub active time SACT2, the third sub block SB3 may be activated during the third sub-active time SACT3, and the fourth sub block SB4 may be activated during the fourth sub active time SACT4. At least one of the plurality of sub blocks SB1 to SB4 may be activated during a total active time TACT.

Power consumed by each sub block may be determined through a power coefficient, a frequency of the clock signal CLK, and a magnitude of the power voltage VDD, as described above with reference to FIG. 2. The frequency of the clock signal CLK applied to the IP device 11 during the sample period SP and the magnitude of the power voltage VDD may be fixed. Accordingly, the power consumed by the sub block may be proportional to the power coefficient C corresponding to the sub block. Referring to FIG. 3, the power consumed by the first sub block SB1 may be P1, the power consumed by the second sub block SB2 may be P2, the power consumed by the third sub block SB3 may be P3, and the power consumed by the fourth sub block SB4 may be P4.

The energy consumed by the IP device 11 during the sample period SP may be a sum of energy consumed by a plurality of sub blocks. Accordingly, the average power consumption Pave of the IP device 11 during the total active time TACT during which at least one sub block is activated may be expressed as [Equation 2].

$$Pave = \frac{P1 + P2 + P3 + P4}{TACT} \quad \text{[Equation 2]}$$
$$= \frac{P1 \cdot SACT1 + P2 \cdot SACT2 + P3 \cdot SACT3 + P4 \cdot SACT4}{TACT}$$

The DVFS controller 11_4 may calculate the average power consumption Pave of the IP device 11 during the sample period SP each time the sample period SP arrives and may adjust an operating condition based on the average power consumption Pave.

In order to control the heating value or to smoothly supply limited power, the maximum power that may be allocated to the IP device 11 may be predetermined. When the average power consumption Pave is low during the sample period SP, the power margin for the maximum power increases. The DVFS controller 11_4 according to an exemplary embodiment of the present disclosure may improve the performance of the IP device 11 by increasing the frequency of the clock signal CLK or the magnitude of the power voltage VDD.

Figure 4:
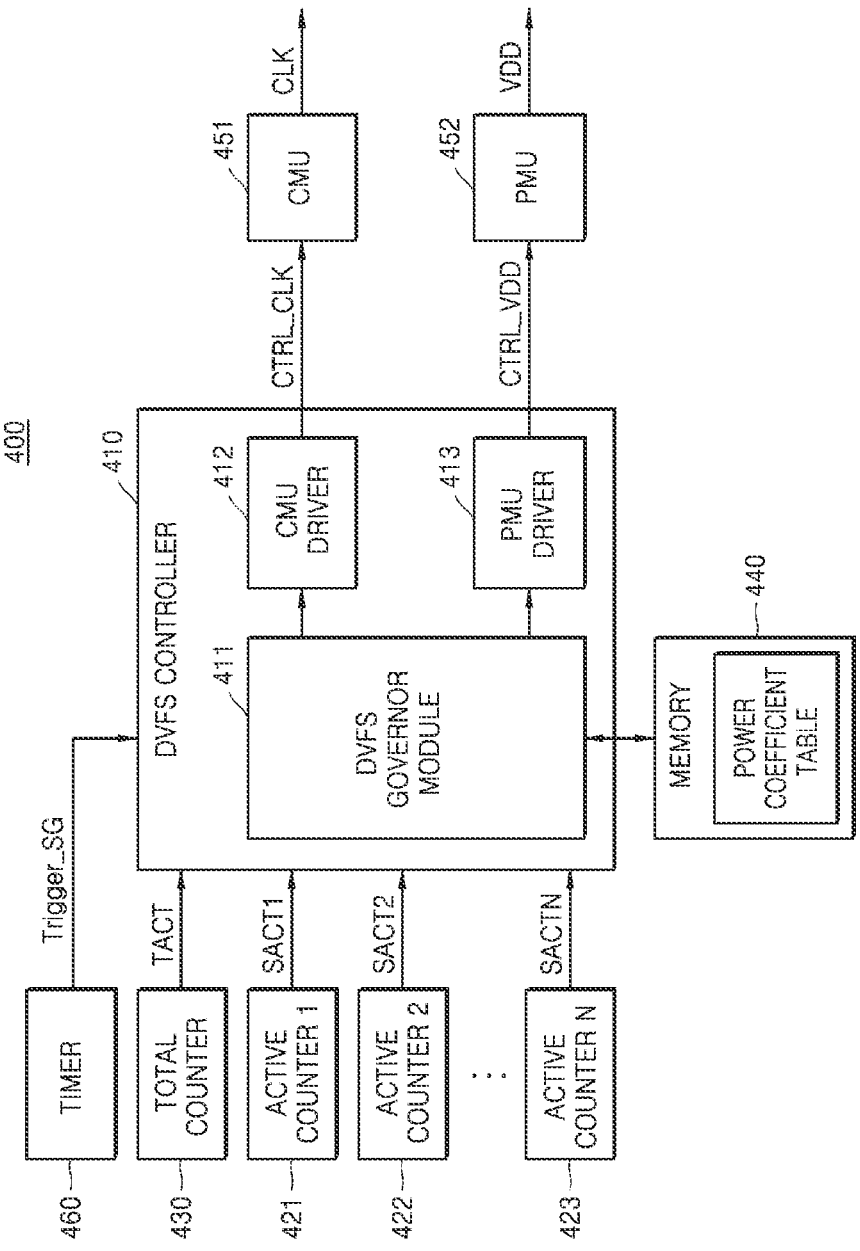
FIG. 4 is a block diagram illustrating a computing system according to an exemplary embodiment of the present disclosure.

FIG. 4 is a block diagram illustrating a computing system according to an exemplary embodiment of the present disclosure. FIG. 5 is a diagram illustrating a power coefficient table according to an exemplary embodiment of the present disclosure. Referring to FIG. 4, a computing system 400 includes a DVFS controller 410, a plurality of active counters 421, 422, and 423, a total counter 430, a memory 440, a clock management unit 451, a power management unit 452, and a timer 460. Descriptions of components identical to those of FIG. 1 may be omitted. The DVFS controller 410 may include a DVFS governor module 411, a clock management unit driver 412, and a power management unit driver 413.

The DVFS governor module 411 may control overall DVFS operations. In some examples, the DVFS governor module 411 may acquire a sub active time from the plurality of active counters 421, 422, and 423 and acquire a total active time from the total counter 430. The DVFS governor module 411 may access the memory 440 and refer to the power coefficient table. The DVFS governor module 411 may calculate the power consumption of the IP device based on the power coefficient of the sub block, the sub active time, and the total active time. The DVFS governor module 411 may control the clock management unit driver 412 and the power management unit driver 413 so that an operating condition is adjusted based on power consumption.

The clock management unit driver 412 may output a clock control signal CTRL_CLK to the clock management unit 451 under control of the DVFS governor module 411. The clock management unit 451 may output a clock signal CLK having a frequency adjusted according to the clock control signal CTRL_CLK. The power management unit driver 413 may output a voltage control signal CTRL_VDD to the power management unit 452 under the control of the DVFS governor module 411. The power management unit 452 may output a power voltage VDD having a magnitude adjusted according to the voltage control signal CTRL_VDD.

The memory 440 may store a power coefficient table. Referring to FIG. 5, the power coefficient table may represent a relationship between a sub block and a power coefficient. Specifically, as described above with reference to FIG. 2, the power coefficient table may represent a relationship between the first to fourth sub blocks SB1 to SB4 and the first to fourth power coefficients C1 to C4.

The DVFS governor module 411 may acquire a sub active time and a total active time from the total counter 430 and a plurality of active counters 421, 422, and 423 and calculate the power consumption of the IP device 11 within the sample period by referring to the power coefficient table.

The DVFS governor module 411 may adjust an operating condition based on power consumption. For example, the DVFS governor module 411 may determine the next frequency Fnext of the clock signal CLK through [Equation 3].

$$Fnext = \frac{WL}{PU} \cdot Fcurrent \quad \text{[Equation 3]}$$

Here, Fnext may be the frequency of the clock signal CLK after the sample period SP, the workload WL may be the workload of the IP device 11 during the sample period SP, the power utilization PU may be the ratio of the power consumed during the sample period SP to the maximum allowable power, and Fcurrent may be the frequency of the clock signal CLK during the sample period SP. The frequency of the clock signal CLK may be referred to as an operating frequency. As described above through [Equation 1], because power may be proportional to the cube of the frequency, unlike [Equation 3], in some embodiments, Fnext may be calculated as inversely proportional to the cube root of the power usage rate as shown in [Equation 4]. On the other hand, it will be apparent to those skilled in the art that a constant or variable may be multiplied or added to the power usage rate or workload to tune Fnext.

$$Fnext = \frac{WL}{\sqrt[3]{PU}} \cdot Fcurrent \quad \text{[Equation 4]}$$

According to [Equation 3] and [Equation 4], in order to adjust the frequency of the clock signal CLK, the DVFS governor module 411 may consider the power usage rate as well as the workload during the sample period SP. That is, when the power consumption of the IP device 11 is low, the DVFS governor module 411 may improve the performance of the IP device 11 by increasing the operating frequency higher.

The DVFS governor module 411 may determine the power usage rate PU according to [Equation 5].

$$PU = \frac{Pave}{Pmax} \quad \text{[Equation 5]}$$

Here, Pave may be calculated through [Equation 2] as the average power consumption and Pmax is the maximum allowable power and may mean the maximum power of the IP device 11 that may be consumed during the sample period. When the power consumption of the IP device 11 exceeds the limit power, the system may not operate normally based on damage to the system due to the flow of an overcurrent above the reference current or due to the temperature of the system rising above the reference temperature. Thus, the maximum allowable power Pmax may be designed to be a part of the limit power, for example at the level of 80%.

Referring to [Equation 3], the power usage rate may have a value of 1 or less. That is, when all sub blocks are active during the sample period, the power usage rate may be 1, and in other cases, the power usage rate may be lower than 1. Referring to [Equation 2], when the power usage rate is lower than 1, the operating frequency may be increased relatively higher than when only the workload is considered. As a result, the DVFS governor module 411 according to an exemplary embodiment of the present disclosure determines an operating frequency considering power usage, so that the performance of the IP device 11 may be improved and power may be efficiently managed.

The workload WL may be calculated through a variety of methods. For example, the workload WL may be calculated through [Equation 6] representing the ratio of the total active time TACT to the sample period SP.

$$WL = \frac{TACT}{SP} \qquad \text{[Equation 6]}$$

However, embodiments are not limited thereto and the workload WL may be calculated based on the number of instructions processed during the sample period, the number of cache hits, or the number of cache misses.

Figure 6:
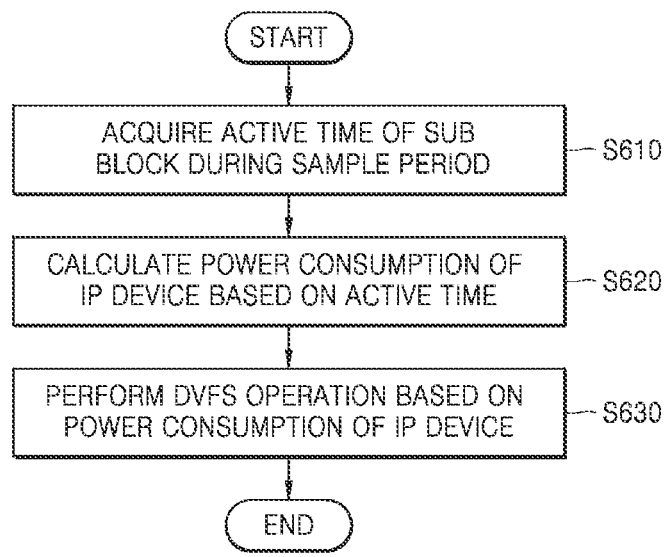
FIG. 6 is a flowchart illustrating a method of operating an IP device, according to an exemplary embodiment of the present disclosure.

FIG. 6 is a flowchart illustrating a method of operating an IP device, according to an exemplary embodiment of the present disclosure. Specifically, FIG. 6 is a flowchart illustrating an operation method of an IP device performing a DVFS operation. Referring to FIG. 6, the method of operating the IP device may include a plurality of steps S610 to S630. Each step of FIG. 6 may be described later with reference to FIG. 1.

In step S610, the plurality of active counters 11_2 and the total counter 11_3 may count active times of the plurality of sub blocks 11_1 during the sample period SP. The plurality of active counters 11_2 may correspond to the plurality of sub blocks 11, respectively. As described above with reference to FIG. 3, the active counter may count the active time of the corresponding sub block. The active time for one sub block may be referred to as a sub active time SACT. As described above with reference to FIG. 3, the total counter 11_3 may count a total active time TACT in which at least one sub block among the plurality of sub blocks 11_1 is active.

In step S620, the DVFS controller 11_4 may calculate power consumption consumed by the IP device 11 during the sample period SP based on the active time. Specifically, the DVFS controller 11_4 may calculate the power consumed by each of the plurality of sub blocks 11_1 by referring to the power coefficient table and calculate the average power consumption consumed by the IP device 11 by dividing the sum of the power consumption of the plurality of sub blocks 11_1 by the total active time TACT.

In step S630, the DVFS controller 11_4 may perform a DVFS operation based on the power consumption of the IP device 11. Specifically, the DVFS controller 11_4 may calculate a power usage rate using the average power consumption and the maximum allowable power and adjust an operating condition for the IP device 11 based on the calculated power usage rate. For example, when the power usage rate is low, the frequency of the clock signal CLK applied to the IP device 11 may be increased or the IP device 11 may output control signals CTRL_CLK and CTRL_VDD so that the magnitude of the power voltage VDD applied to the IP device 11 is increased.

The method of operating an IP device according to an exemplary embodiment of the present disclosure may improve the performance of the IP device and the efficiency of power management by performing a DVFS operation based on power consumption of the IP device.

Figure 7:
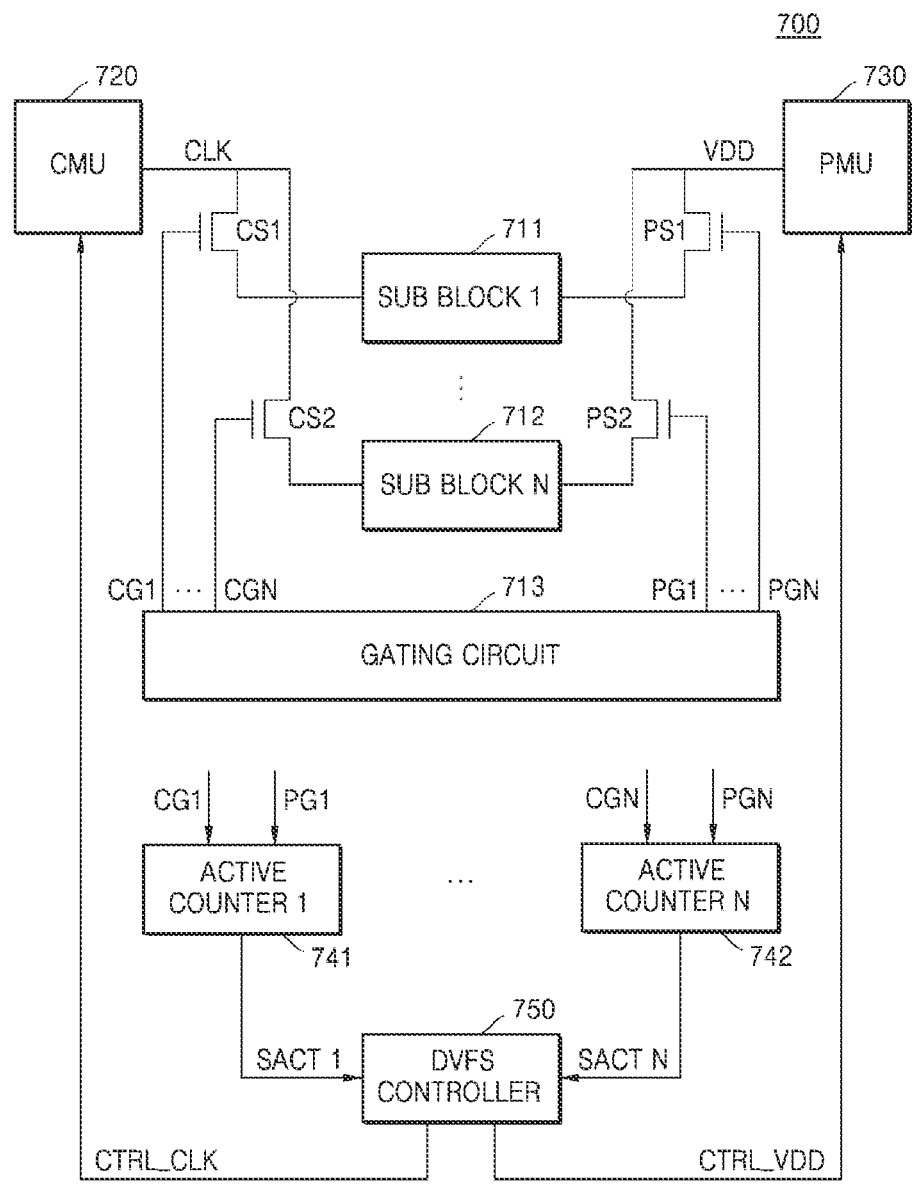
FIG. 7 is a block diagram illustrating a system including a gating circuit according to an exemplary embodiment of the present disclosure.

FIG. 7 is a block diagram illustrating a system including a gating circuit according to an exemplary embodiment of the present disclosure.

Referring to FIG. 7, a system 700 may include a gating circuit 713. The gating circuit 713 controls the clock signal CLK or the power voltage VDD applied to the sub block in the idle state to be cut off, thereby minimizing power wasted in the idle state. Specifically, the gating circuit 713 outputs a plurality of gating signals CG1 to CGN and PG1 to PGN, so that the clock signal CLK or the power voltage VDD may be controlled to be selectively applied to a plurality of sub blocks 711 and 712.

The system 700 may include a plurality of switches CS1, CS2, PS1, and PS2. The first and second clock switches CS1 and CS2 may switch the clock signal CLK according to the clock gating signals GC1 to CGN. For example, when the clock gating signal is at a logic high level, the clock switch may be turned on and the clock signal CLK may be provided to a corresponding sub block. That is, when the clock gating signal instructs activation of the clock signal, the clock signal CLK may be provided to the sub block. However, the embodiment is not limited thereto and the clock switch may have various structures. The first and second power switches PS1 and PS2 may switch the power voltage VDD according to the power gating signals PG1 to PGN. For example, when the power gating signal is at a logic high level, the power switch may be turned on and the power voltage VDD may be provided to a corresponding sub block. That is, when the power gating signal instructs activation of the power voltage, the power voltage VDD may be provided to the sub block. However, the embodiment is not limited thereto and the clock switch may have various structures. In some embodiments, the power switch may be a header switch implemented as a P-type Field Effect Transistor (PFET) or a foot switch implemented as an N-type Field Effect Transistor (NFET).

The plurality of active counters 741 and 742 may count the sub-active time of the plurality of sub blocks 711 and 712 based on the gating signals CG1 to CGN, and PG1 to PGN. For example, when the first clock gating signal CG1 is at a logic high level, because the first sub block 711 is active, the first active counter 741 may acquire a first sub active time SACT1 by counting a period in which the first clock gating signal CG1 is at a logic high level. That is, the sub-active time may correspond to a time when the clock gating signal instructs activation of the clock signal. Alternatively, the sub active time may correspond to a time when the power gating signal instructs activation of the power voltage.

The DVFS controller 750 according to an exemplary embodiment of the present disclosure may perform a DVFS operation in which power consumption is reflected by using a sub-active time acquired based on a gating control signal. Accordingly, the performance of the system 700 may be improved and the efficiency of power management may be improved.

Figure 8:
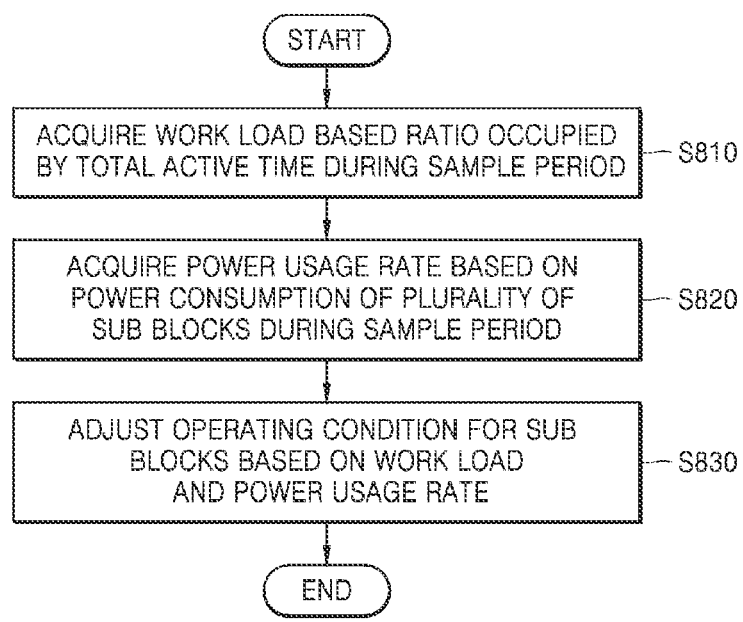
FIG. 8 is a flowchart illustrating a method of operating an IP device, according to an exemplary embodiment of the present disclosure.

FIG. 8 is a flowchart illustrating a method of operating an IP device, according to an exemplary embodiment of the present disclosure. Specifically, FIG. 8 is a flowchart illustrating a method of a DVFS controller for adjusting operating conditions of sub blocks. Referring to FIG. 8, the method of operating the IP device may include a plurality of steps S810 to S830. Each step of FIG. 8 may be described later with reference to FIG. 1 or FIG. 4.

In step S810, the DVFS controller 11_4 may acquire a workload based on a ratio of the total active time to the sample period SP. Specifically, the DVFS controller 11_4 may acquire a workload by referring to [Equation 6]. The sample period SP may correspond to a period in which the DVFS controller 11_4 performs a DVFS operation. The timer 460 periodically counts the sample period SP and outputs a trigger signal Trigger_SG to the DVFS controller 410 whenever the sample period SP passes, thereby instructing the start of the DVFS operation. The total active time may be a time when at least one of a plurality of sub blocks is in an active state. The method of acquiring the workload is not limited thereto and may be calculated based on the number of instructions processed during the sample period, the number of cache hits, or the number of cache misses.

In step S820, the DVFS controller 11_4 may acquire a power usage rate based on power consumption of a plurality of sub blocks during a sample period SP. For example, the DVFS controller 11_4 may acquire the power usage rate by referring to [Equation 5]. The power usage rate may represent a ratio of the power consumption actually used to the maximum power that the IP device 11 may consume.

In step S830, the DVFS controller 11_4 may adjust operating conditions for sub blocks based on the workload and power usage rate. For example, the DVFS controller 11_4 may adjust the frequency of the clock signal CLK with reference to [Equation 3] or [Equation 4]. That is, the DVFS controller 11_4 according to an exemplary embodiment of the present disclosure adjusts the operating condition based on the power usage rate, so that if there is room in the power margin, the performance of the IP device may be improved. Even if power consumption increases due to performance improvement (an increase in the operating frequency or an increase in the magnitude of the power voltage), because there is a margin in the power margin, efficient power management may be performed.

Figure 9:
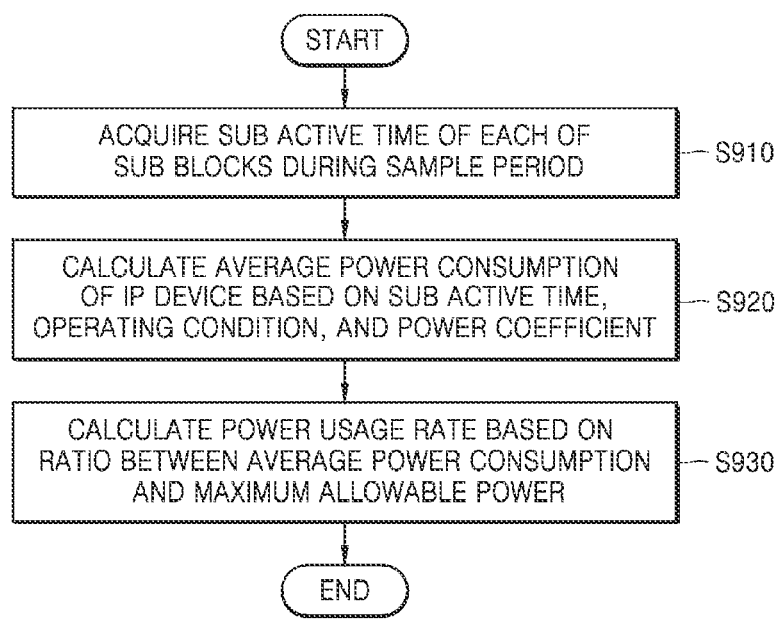
FIG. 9 is a flowchart illustrating a method of calculating a power usage rate, according to an exemplary embodiment of the present disclosure.

FIG. 9 is a flowchart illustrating a method of calculating a power usage rate according to an exemplary embodiment of the present disclosure. Specifically, FIG. 9 may be a method corresponding to step S820 of FIG. 8. The method of calculating the power usage rate may include a plurality of steps S910 to S930. Each step of FIG. 9 may be described later with reference to FIG. 1, 4 or 7.

In step S910, the DVFS controller 410 may acquire sub active times SACT1, SACT2, SACT3 of a plurality of sub blocks from the plurality of active counters 421 to 423. The sub active time may be a time when a sub block is in an active state. As described above with reference to FIG. 7, the sub active time may correspond to a time in which the gating control signal output from the gating circuit 713 instructs activation of a clock signal or a power voltage.

In step S920, the DVFS controller 410 may calculate the average power consumption of the IP device in the sample period based on the sub active time and the power coefficient. Specifically, the DVFS controller 410 may identify the power coefficient corresponding to each sub block based on the power coefficient table stored in the memory 440 and calculate individual power consumption consumed by each sub block using [Equation 1]. Thereafter, the average power consumption of the IP device may be calculated using [Equation 2]. Specifically, the energy consumed by the sub block may be calculated by multiplying the individual power consumption of the sub block by the sub active time of the sub block and the average power consumption may be calculated by dividing the energy consumed by a plurality of sub blocks by the total active time TACT.

In step S930, the DVFS controller 410 may calculate the power usage rate based on a ratio between the average power consumption and the maximum allowable power.

Figure 10:
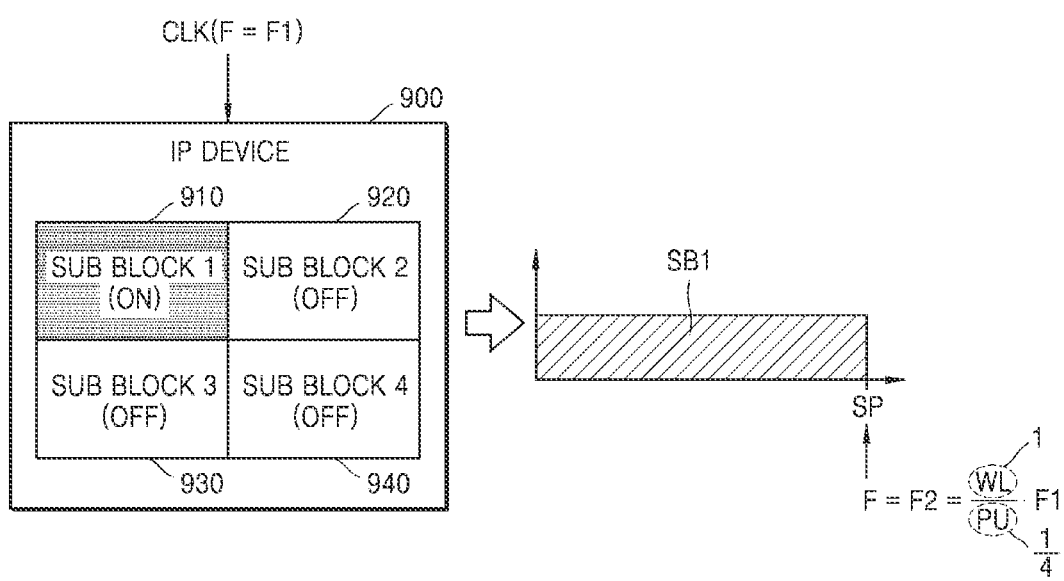
FIG. 10 is a diagram illustrating a change in an operating condition according to an exemplary embodiment of the present disclosure.

FIG. 10 is a diagram illustrating a change in an operating condition according to an exemplary embodiment of the present disclosure. Specifically, FIG. 10 is a diagram illustrating that a first sub block 910 among a plurality of sub blocks 910 to 940 included in an IP device 900 is in an active state during a sample period SP. In FIG. 10, when a sub block is in an active state, this may be displayed as ON, and when a sub block is in an idle state, this may be displayed as OFF. In FIG. 10, it may be assumed that the power consumed by each sub block is the same. That is, unlike the graph shown in FIG. 2, the power coefficients of a plurality of sub blocks may be the same.

Referring to the left side of FIG. 10, a clock signal CLK having a first frequency F1 may be applied to the IP device 900 during a sample period SP. The sub blocks 910 to 940 may process an instruction based on the clock signal CLK. Referring to the right side of FIG. 10, when the sample period SP passes, the DVFS controller 11_4 may adjust the frequency of the clock signal CLK to the second frequency F2. FIG. 10 illustrates frequency adjustment using [Equation 3], but the embodiment is not limited thereto. For example, the DVFS controller 11_4 may adjust the frequency using [Equation 4].

Because only one sub block is activated during the sample period SP, the power usage rate may be ¼, and because at least one sub block is always activated during the sample period SP, the workload may be 1. Accordingly, the second frequency F2 may be determined to be four times the first frequency F1. However, the embodiment is not limited thereto and parameters may be added or multiplied to each of the workload and power usage rate in order to optimize frequency adjustment.

Figure 11:
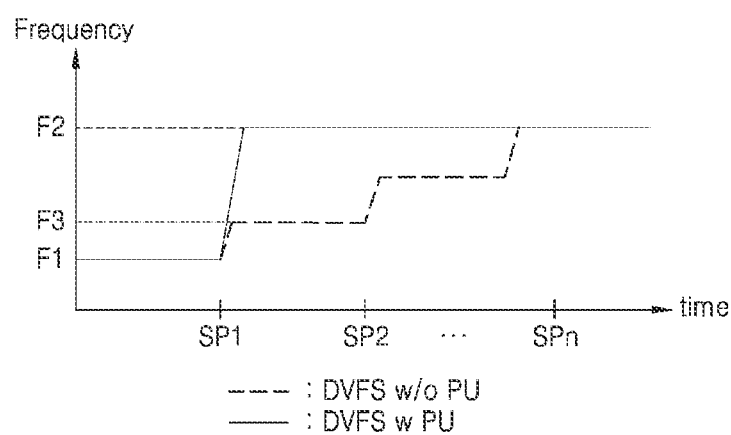
FIG. 11 is a diagram for describing responsivity of a Dynamic Voltage and Frequency Scaling (DVFS) operation according to an exemplary embodiment of the present disclosure.

FIG. 11 is a diagram for describing responsivity of a DVFS operation according to an exemplary embodiment of the present disclosure. Specifically, referring to FIG. 11, a solid line represents a graph of operation frequency adjustment considering power usage rate and a dashed line represents a graph of operation frequency adjustment without power usage rate. For example, the graph of the solid line may be a graph corresponding to the operation frequency adjustment described above with reference to FIG. 10. In FIG. 11, the operating frequency may be adjusted for each sample period SP.

As shown by the solid line in FIG. 11, in a case of adjusting the operating frequency considering the power usage rate, when the first sample period SP1 passes, the operating frequency may increase from the first frequency F1 to the second frequency F2. As described above with reference to FIG. 10, the extent to which the operating frequency increases due to the power usage rate may be increased.

On the other hand, as shown by the dashed line in FIG. 11, in a case of adjusting the operating frequency without considering the power usage rate, when the first sample period SP1 passes, the operating frequency may increase from the first frequency F1 to the third frequency F3. The third frequency F3 may be less than the second frequency F2. When the operating frequency is adjusted without considering the power usage rate, the operating frequency may reach the second frequency F2 after the n-th sample period SPn passes. That is, when the operating frequency is adjusted considering the power usage rate, the operating frequency may increase rapidly.

As a result, when performing a DVFS operation using a power usage rate according to an exemplary embodiment of the present disclosure, as the range of the operating frequency increases, responsivity for improving the performance of the IP device 900 may be improved.

Figure 12:
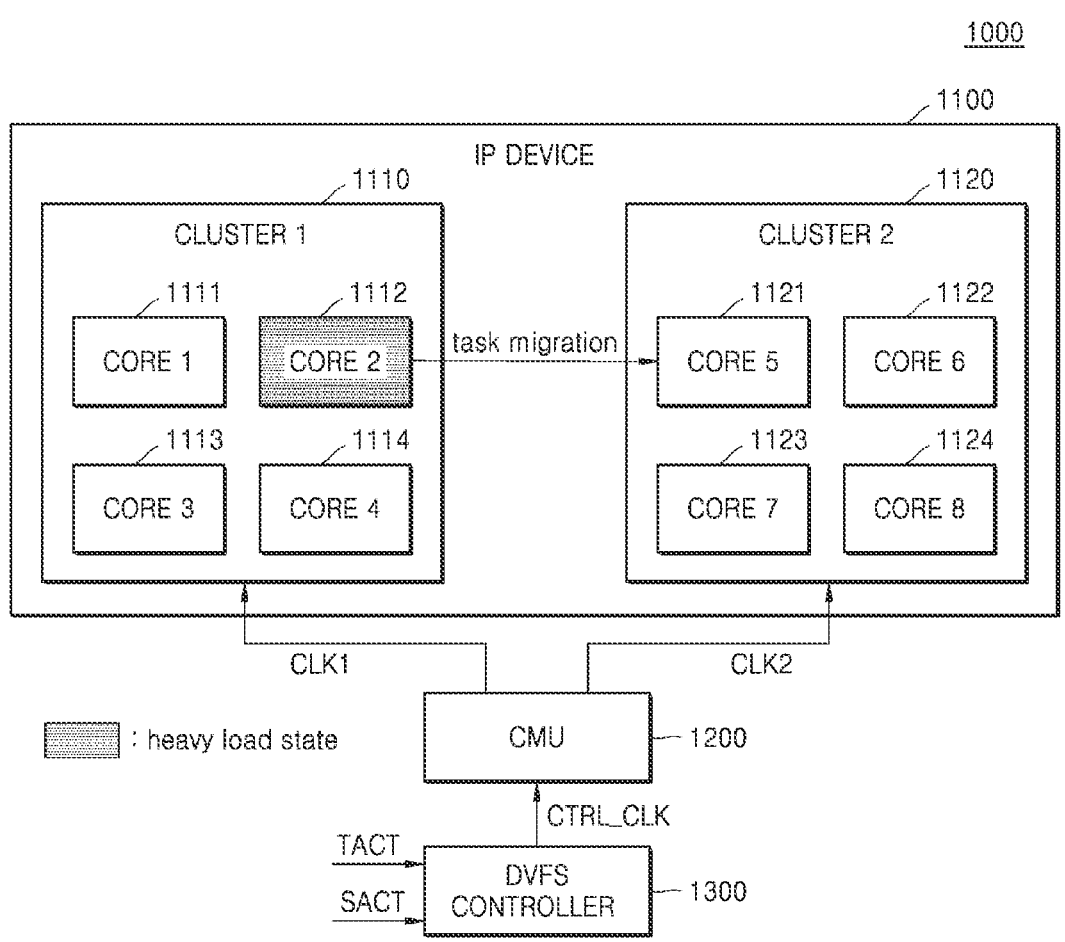
FIG. 12 is a block diagram showing a system including a plurality of clusters according to an exemplary embodiment of the present disclosure.

FIG. 12 is a block diagram showing a system including a plurality of clusters according to an exemplary embodiment of the present disclosure. Referring to FIG. 12, a system 1000 may include an IP device 1100 having a first cluster 1110 a second cluster 1120, a clock management unit 1200, and a DVFS controller 1300. The first cluster 1110 may include first to fourth cores 1111 to 1114, and the second cluster 1120 may include fifth to eighth cores 1121 to 1124. For convenience of description, FIG. 12 illustrates that the first cluster 1110 and the second cluster 1120 each include four cores, but the embodiment is not limited thereto. Although not shown in the drawing, the system 1000 may further include counters for counting the sub active time and the total active time of the cores 1111 to 1114 included in the first cluster 1110 and the cores 1121 to 1124 included in the second cluster 1120.

The performances of the cores 1111 to 1114 included in the first cluster 1110 may be different from the performances of the cores 1121 to 1124 included in the second cluster 1120. Hereinafter, it is assumed that the amount of operation per unit time of the cores 1111 to 1114 included in the first cluster 1110 is smaller than the amount of operation per unit time of the cores 1121 to 1124 included in the second cluster 1120. The clock management unit 1200 may output a first clock signal CLK1 and a second clock signal CLK2, the first cluster 1110 may process commands according to the first clock signal CLK1, and the second cluster 1120 may process commands according to the second clock signal CLK2.

When the work load of the core is greater than the reference value, the corresponding core may be in a heavy load state. For example, the second core 1112 of the first cluster 1110 may be in a heavy load state. When the frequency of the first clock signal CLK1 applied to the second core 1112 in the heavy load state reaches the reference frequency, at least some of the tasks allocated to the second core 1112 may be migrated to the core included in the second cluster 1120. As a part of the task is migrated to a core having a relatively large amount of computations, the performance and power management efficiency of the system 1000 may be improved.

As the operating frequency reaches the reference value faster, it may be beneficial for task migration. As described above with reference to FIG. 11, the DVFS controller 1040 according to an exemplary embodiment of the present disclosure adjusts the operating frequency based on the power usage rate such that frequency responsivity may be improved and task migration performance may be improved accordingly.

Figure 13:
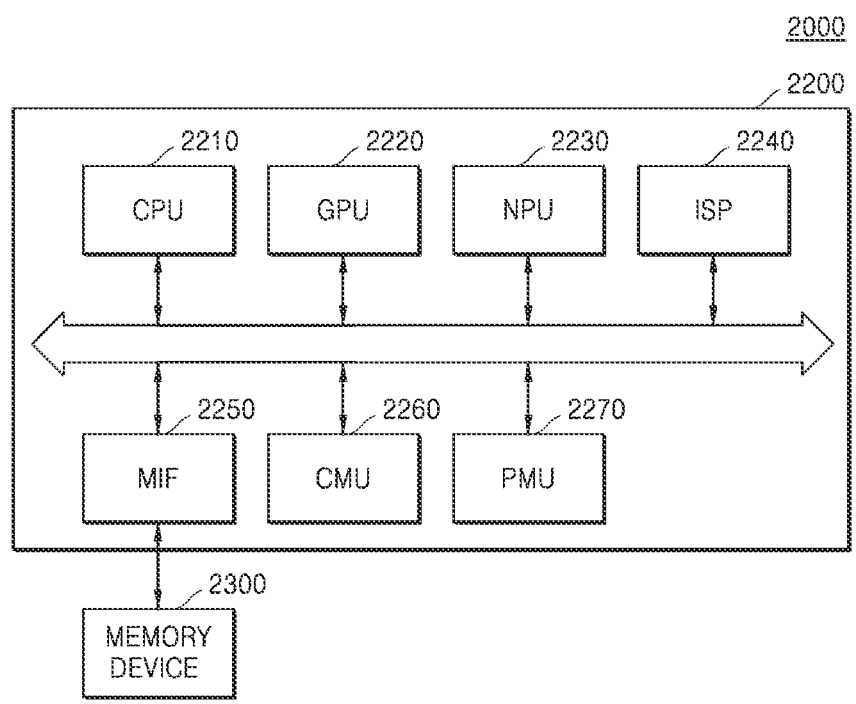
FIG. 13 is a block diagram illustrating a system according to an exemplary embodiment of the present disclosure.

FIG. 13 is a block diagram illustrating a system according to an exemplary embodiment of the present disclosure. Referring to FIG. 13, a system 2000 may be implemented as a handheld device, such as a mobile phone, a smartphone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book.

The system 2000 may include an SoC 2200 and a memory device 2300. The SoC 2200 may include a CPU 2210, a GPU 2220, an NPU 2230, an ISP 2240, a memory interface (MIF) 2250, a clock management unit (CMU) 2260, and a power management unit (PMU) 2270. The CPU 2210, the GPU 2220, the NPU 2230, and the ISP 2240 may be referred to as a master IP device, and the MIF 2250 may be referred to as a slave IP device. At least one of the CPU 2210, the GPU 2220, the NPU 2230, the ISP 2240, and the MIF 2250 may be an example implementation of the IP device described above with reference to FIGS. 1 to 12. Accordingly, at least one of the CPU 2210, the GPU 2220, the NPU 2230, the ISP 2240, and the MIF 2250 may include a plurality of sub blocks and may include a DVFS controller that performs a DVFS operation based on power consumed by a plurality of sub blocks. The DVFS controller included in the CPU 2210, the GPU 2220, the NPU 2230, the ISP 2240, and the MIF 2250 may control the CMU 2260 or the PMU 2270, and the CPU 2210, the GPU 2220, the NPU 2230, the ISP 2240, and the MIF 2250 receive a clock signal CLK from the CMU 2260 and receive a power voltage from the PMU 2270 to process an instruction.

The CPU 2210 may process or execute instructions and/or data stored in the memory device 2300 in response to a clock signal generated by the CMU 2260.

The GPU 2220 may acquire image data stored in the memory device 2300 in response to a clock signal generated by the CMU 2260. The GPU 2220 may generate data for an image output through a display device (not shown) from image data provided from the MIF 2250 or may encode image data.

The NPU 2230 may refer to any device that executes a machine learning model. The NPU 2230 may be a hardware block designed to execute a machine learning model. The machine learning model may be a model based on an artificial neural network, a decision tree, a support vector machine, a regression analysis, a Bayesian network, or a genetic algorithm. Artificial neural networks may include, as non-limiting examples, a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

The ISP 2240 may perform a signal processing operation on raw data received from an image sensor (not shown) located outside the SoC 2200 and generate digital data having improved image quality.

The MIF 2250 may provide an interface for the memory device 2300 located outside the SoC 2200. The memory device 2300 may be dynamic random access memory (DRAM), phase-change random access memory (PRAM), resistive random access memory (ReRAM), or flash memory.

The CMU 2260 may generate a clock signal and provide the clock signal to components of the SoC 2200. The CMU 2260 may include a clock generation device such as a phase locked loop (PLL), a delayed locked loop (DLL), and a crystal. The PMU 2270 may convert an external power source into an internal power source and supply the internal power source to the components of the SoC 2200 as power.

Figure 14:
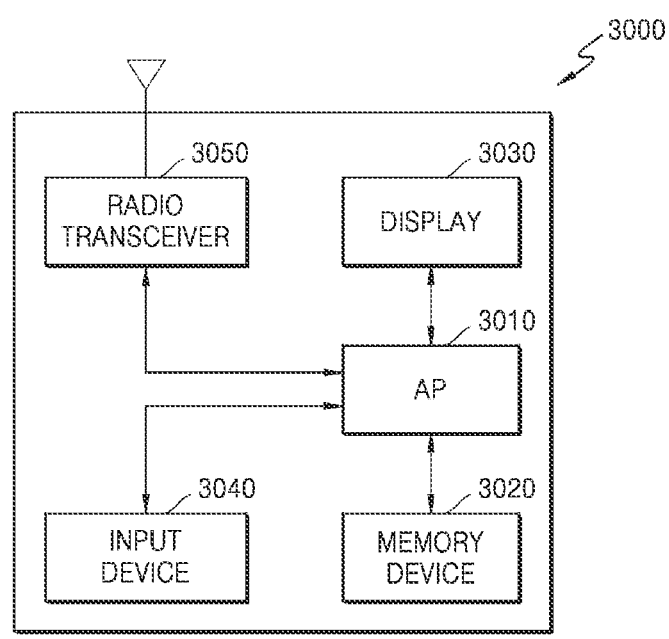
FIG. 14 is a block diagram showing a communication device including an application processor according to an exemplary embodiment of the present disclosure.

FIG. 14 is a block diagram showing a communication device including an application processor according to an exemplary embodiment of the present disclosure.

Referring to FIG. 14, the communication device 3000 may include an application processor 3010, a memory device 3020, a display 3030, an input device 3040, and a radio transceiver 3050. The application processor 3010 may be an example implementation of at least one of the IP devices described above with reference to FIGS. 1 to 13.

The radio transceiver 3050 may transmit or receive a wireless signal through an antenna. For example, the radio transceiver 3050 may change a wireless signal received through the antenna into a signal that may be processed by the application processor 3010.

Accordingly, the application processor 3010 may process the signal output from the radio transceiver 3050 and transmit the processed signal to the display 3030. In addition, the radio transceiver 3250 may change a signal output from the application processor 3010 into a wireless signal and output the changed wireless signal to an external device through the antenna.

The input device 3040 is a device capable of inputting a control signal for controlling the operation of the application processor 3010 or data to be processed by the application processor 3010 and may be implemented as a pointing device such as a touch pad and a computer mouse, a keypad, or a keyboard.

According to an embodiment, the application processor 3010 may include a DVFS controller that controls a plurality of sub blocks and operating conditions of the plurality of sub blocks. As described above with reference to FIGS. 1 to 13, the DVFS controller may adjust an operating condition based on power consumed by a plurality of sub blocks.

Although not shown in FIG. 14, a clock management unit providing a clock signal to various components included in the communication device 3000 and a power management unit providing a power voltage may be further included. The clock management unit may output a clock signal having a frequency adjusted according to the control of the DVFS controller, and the power management unit may output a power voltage having a magnitude adjusted according to the control of the DVFS controller.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. An integrated circuit comprising:
a plurality of sub circuits configured to process an instruction according to an operating condition;
a plurality of active counters configured to count an individual active time, which is a time for each sub circuit of the plurality of sub circuits to process an instruction;
a total counter configured to count a total active time during which at least one sub circuit of the plurality of sub circuits is active; and
a Dynamic Voltage and Frequency Scaling (DVFS) circuit configured to
derive a workload for the plurality of sub circuits,
derive energy consumed by each sub circuit of the plurality of sub circuits during a sample period based on a product of an individual active time of each sub circuit and an individual power consumption of each sub circuit,
derive a total power consumption of the plurality of sub circuits during the sample period based on a ratio of a sum of the energy consumed by each sub circuit of the plurality of sub circuits to the total active time,
derive a power usage rate based on the total power consumption of the plurality of sub circuits; and
adjust an operating condition of the plurality of sub circuits based on the ratio of the workload to the power usage rate.

2. The integrated circuit of claim 1, wherein the DVFS circuit acquires the workload based on a ratio of the sample period to a time when at least one of the plurality of sub circuits is active.

3. The integrated circuit of claim 1, wherein the DVFS circuit acquires a power coefficient corresponding to each of the plurality of sub circuits by referring to a power coefficient table stored in an external memory and determines the individual power consumption using the power coefficient and the operating condition.

4. The integrated circuit of claim 3, wherein the operating condition is a frequency of a clock signal applied to the plurality of sub circuits or a magnitude of a power voltage applied to the plurality of sub circuits.

5. The integrated circuit of claim 4, further comprising: a gating circuit for selectively providing the clock signal or the power voltage to the plurality of sub circuits using a gating control signal, wherein each of the plurality of active counters counts the individual active time based on the gating control signal.

6. The integrated circuit of claim 1, wherein:
the plurality of sub circuits comprises:
first sub circuits configured to process an instruction according to a first clock signal; and
second sub circuits configured to process an instruction according to a second clock signal, and
when a frequency of the first clock signal adjusted based on individual power consumption of the first sub circuits exceeds a reference value, at least one of the second sub circuits processes an instruction allocated to at least one of the first sub circuits.

7. The integrated circuit of claim 1, wherein each of the plurality of sub circuits is one of a central processing unit (CPU) core, a graphics processing unit (GPU) core, a neural processing unit (NPU) core, or an image signal processor (ISP) core.

8. A method of operating an integrated circuit including a plurality of sub circuits that processes an instruction according to an operating condition, the method comprising:
  counting, by a total counter, a total active time during which at least one sub circuit of the plurality of sub circuits is active;
  obtaining a workload based on a ratio of a sample period to the total active time in which at least one of the plurality of sub circuits is active;
  deriving energy consumed by each sub circuit of the plurality of sub circuits during the sample period based on a product of an individual active time of each sub circuit and individual power consumption of each sub circuit;
  deriving a total power consumption based on a ratio of a sum of the energy consumed by each sub circuit of the plurality of sub circuits to the total active time;
  obtaining a power usage rate based on the total power consumption of the plurality of sub circuits during the sample period; and
  adjusting an operating condition according to a ratio between the workload and the power usage rate.

9. The method of claim 8, wherein the obtaining of the power usage rate comprises:
  obtaining a sub active time of each of the plurality of sub circuits during the sample period;
  calculating an average power consumption of the plurality of sub circuits during the sample period based on the sub active time; and
  calculating a power usage rate based on a ratio between the average power consumption and a predetermined maximum power.

10. The method of claim 9, wherein the operating condition is a frequency of a clock signal applied to the plurality of sub circuits or a magnitude of a power voltage applied to the plurality of sub circuits.

11. The method of claim 10, wherein the obtaining of the sub active time comprises calculating the sub active time based on the clock signal applied to the plurality of sub circuits or a gating control signal for controlling blocking of the power voltage.

12. The method of claim 9, wherein the calculating of the average power consumption comprises:
  obtaining a power coefficient corresponding to each of the plurality of sub circuits by referring to a power coefficient table; calculating the individual power consumption of each of the plurality of sub circuits during the sample period using the power coefficient and the operating condition;
  calculating energy consumed by the plurality of sub circuits based on the individual power consumption of each of the plurality of sub circuits and the sub active time; and
  calculating the average power consumption by dividing the energy by the total active time.

13. A computing system comprising:
  a plurality of sub circuits each configured to process an instruction according to an operating condition;
  active counters respectively corresponding to the plurality of sub circuits and configured to count a sub active time, which is an active time of each corresponding sub circuit;
  a total counter configured to count a total active time during which at least one sub block of the plurality of sub circuits is active;
  a clock management circuit configured to determine a clock signal applied to the plurality of sub circuits;
  a power management circuit configured to determine a power voltage applied to the plurality of sub circuits; and
  a Dynamic Voltage and Frequency Scaling (DVFS) circuit configured to derive a workload of the plurality of sub circuits,
  derive energy consumed by each sub circuit of the plurality of sub circuits during a sample period based on a product of an individual active time of each sub circuit and individual power consumption of each sub circuit,
  derive a total power consumption consumed by the plurality of sub circuits during the sample period based on a ratio of a sum of the energy consumed by each sub circuit of the plurality of sub circuits to the total active time,
  derive a power usage rate based on the total power consumption of the plurality of sub circuits, and
  control the clock management circuit or the power management circuit to adjust a frequency of the clock signal or a magnitude of the power voltage based on the ratio of the workload to the power usage rate.

14. The computing system of claim 13, further comprising:
  a timer configured to determine a DVFS trigger signal for each sample period and output the DVFS trigger signal to the DVFS circuit, wherein
  the DVFS circuit controls the clock management circuit or the power management circuit in response to the DVFS trigger signal.

15. The computing system of claim 14, further comprising:
  a memory configured to store a power coefficient table indicating a power coefficient corresponding to each of the plurality of sub circuits, wherein
  the DVFS circuit determines a total power consumed by the plurality of sub circuits during the sample period by referring to the power coefficient table.

16. The computing system of claim 13, further comprising:
  a gating circuit configured to output a gating control signal for controlling the clock signal or the power voltage to be provided to the plurality of sub circuits, wherein
  the DVFS circuit acquires the sub active time based on the gating control signal.

17. The computing system of claim 13, wherein:
  the plurality of sub circuits comprises:
    first sub circuits with relatively low performance; and
    second sub circuits with relatively high performance, and
  when a frequency of a clock signal adjusted based on the total power consumption reaches a reference frequency, at least one of the second sub circuits processes an instruction allocated to at least one of the first sub circuits.

18. The computing system of claim 13, wherein the DVFS circuit determines a frequency after the sample period of the clock signal based on a ratio of the total power consumption and a maximum allowable power that the plurality of sub circuits are capable of consuming during the sample period.

* * * * *